UNITED STATES PATENT OFFICE.

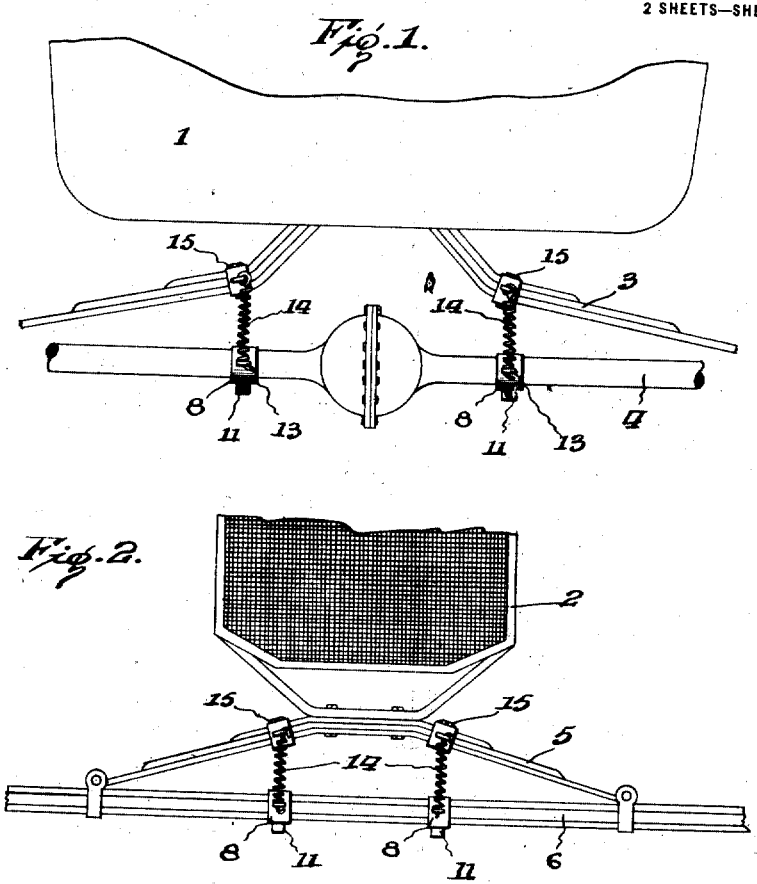

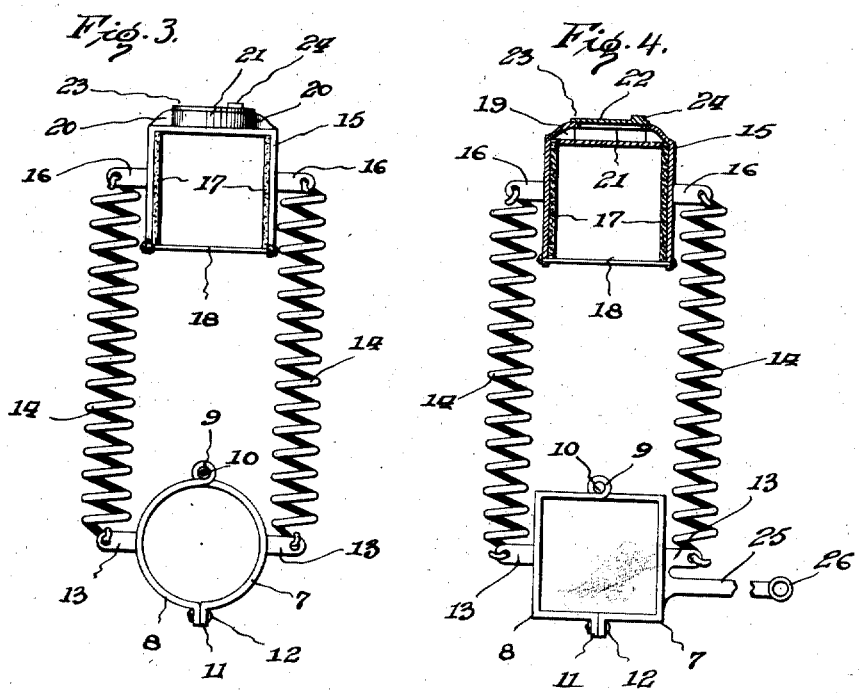

LENNIE A. HANSON, OF DEERING, NORTH DAKOTA.

ATTACHMENT FOR MOTOR-CARS.

1,226,656.  Specification of Letters Patent.  Patented May 22, 1917.

Application filed April 12, 1916. Serial No. 90,702.

*To all whom it may concern:*

Be it known that I, LENNIE A. HANSON, a citizen of the United States, residing at Deering, in the county of McHenry and State of North Dakota, have invented certain new and useful Improvements in Attachments for Motor-Cars, of which the following is a specification.

This invention is an attachment for motor cars and one object of the invention is to provide a simple and efficient device whereby shocks due to motor cars striking ruts or obstructions in the road will be minimized.

The invention is illustrated in the accompanying drawings and resides in certain novel features which will be first fully described and then particularly pointed out in the claim following the description.

In the drawings:

Figure 1 is an elevation showing the device applied to the rear springs of a motor car;

Fig. 2 is a similar view showing the device applied to the front spring;

Fig. 3 is a detail view of the attachment arranged for application to the rear axle and rear springs;

Fig. 4 is a similar view showing the attachment adapted for application to the front axle and spring.

In the annexed drawings, the reference numeral 1 indicates the rear portion of an automobile body and 2 designates the radiator usually provided at the front end of the automobile. 3 designates the rear spring and 4 the rear axle, while 5 designates the front spring and 6 designates the front axle.

In carrying out my invention, I employ a clamp consisting of two members 7 and 8 which are suitably shaped to fit around the axle, the clamp to be applied to the rear axle being circular, as shown in Fig. 4, and the clamp to be applied to the front axle being rectangular, as shown in Fig. 5. The members of the clamp are provided on their upper sides with registering longitudinally disposed eyes 9 through which is inserted a pin or pintle 10 whereby to hold the members together and on their under sides the said members are provided with depending lugs or ears 11 through which a bolt or similar fastening 12 is inserted transversely of the clamp so that the members will be securely fastened around the axle. Each member of the clamp is constructed with an outstanding lug 13 to which is secured the lower end of a coiled spring 14 which passes from said lug up to the spring disposed over the axle. Fitting around the spring is a box or inverted U-shaped bracket 15 having lugs 16 projecting from its front and rear sides and the upper ends of the springs 14 are secured to said lugs, it being readily understood that two springs 14 are provided on each attachment and that the said springs are disposed at opposite sides of the axle and the elliptic spring to which the device is applied. The box or U-shaped bracket 15 is lined with felt or similar material, as shown at 17, and below the elliptic spring a cross bar or plate 18 extends between the lower edges of the box or bracket whereby to secure the same upon the elliptic spring. This keeper 18 may be secured in place in any desired manner but will preferably be inserted through depending lugs or ears, formed on the edges of the box or bracket, and held in position by nuts, cotter pins, or similar well-known fastening devices. The absorbent lining 17 may be secured to the sides of the box or bracket 15 in any convenient manner and will project into passages 19 within hollow enlargements 20 formed on the upper side of the bracket and communicating with an oil cup or box 21. The cover 22 of this oil box is secured in place by a screw or similar device 23 inserted through the cover into the edge of the vertical wall of the cup and a projection 24 is provided on the upper side of the cover to facilitate the handling of the same when it is necessary to remove it and refill the cup.

It is thought the operation and advantages of my attachment will be readily understood and appreciated from the foregoing description, taken in conection with the accompanying drawings. It is to be understood that two clamps are provided upon each axle and that the shock absorbing springs 14 are provided in duplicate at each side of the longitudinal center of the car so that two pair of said springs will be connected to each elliptic spring. Lubricant is placed in the cups 22 and will saturate the pads or linings 17 and as these linings or pads are in direct contact with the elliptic spring, the lubricant will pass directly to the leaves of the spring and will work into the space between the same so that the wear, due to friction between the contacting faces of the leaves of the springs, will be minimized and the movement of the springs made free and easy. Should the vehicle strike a deep rut or an obstruction, the rebound will be absorbed by the springs 14 so that the comfort of the occupants of the vehicle will be promoted.

My device is exceedingly simple in the construction and arrangement of its parts and may be readily applied to a car by an unskilled person. By its use the comfort of the occupants of a car will be enhanced and the life of the elliptic spring will be prolonged through the lubrication of the same and the reduction of the strain now imposed thereon by the rebound of the car after striking a rut or hole.

Having thus described the invention, what is claimed as new is:

The combination with a vehicle axle, and an elliptic spring disposed above and in the same vertical plane with the axle, of a box fitting over and against the front and rear sides of said spring, a keeper member engaging the lower edges of the sides of said box and passing beneath the spring to retain the box thereon, clamping members fitting closely around the axle, means at the top and bottom of said clamping members to secure them together and around the axle, lugs extending from the front and rear sides of the boxes, lugs extending from the front and rear sides of the clamping members, and tension springs extending between the lugs on the boxes and the lugs on the clamping members below the same and having their ends secured respectively to the said lugs.

In testimony whereof I affix my signature.

LENNIE A. HANSON. [L. S.]